US008002862B2

(12) United States Patent
Schultink

(10) Patent No.: US 8,002,862 B2
(45) Date of Patent: Aug. 23, 2011

(54) FILTER BAG AND METHOD FOR THE PRODUCTION THEREOF

(75) Inventor: Jan Schultink, Overpelt (BE)

(73) Assignee: Eurofilters N.V., Overpelt (BE)

( * ) Notice: Subject to any disclaimer, the term of this patent is extended or adjusted under 35 U.S.C. 154(b) by 232 days.

(21) Appl. No.: 10/576,225

(22) PCT Filed: Oct. 15, 2004

(86) PCT No.: PCT/EP2004/011648

§ 371 (c)(1), (2), (4) Date: Mar. 12, 2007

(87) PCT Pub. No.: WO2005/034708

PCT Pub. Date: Apr. 21, 2005

(65) Prior Publication Data

US 2007/0175190 A1 Aug. 2, 2007

(30) Foreign Application Priority Data

Oct. 17, 2003 (DE) .................................. 103 48 375

(51) Int. Cl.
*B01D 46/02* (2006.01)

(52) U.S. Cl. ................ 55/367; 55/369; 55/381; 55/382; 55/DIG. 2; 15/347; 156/62.6; 156/260; 156/266; 156/554

(58) Field of Classification Search ................. 15/327.2, 15/347, 351; 156/62.6, 260, 266, 554; 55/367, 55/369, 374, 381, 373, DIG. 2
See application file for complete search history.

(56) References Cited

U.S. PATENT DOCUMENTS

| | | | | | |
|---|---|---|---|---|---|
| 3,333,523 | A | * | 8/1967 | Terzuoli | 493/197 |
| 3,616,621 | A | * | 11/1971 | Fesco et al. | 55/367 |
| 3,738,091 | A | * | 6/1973 | Fesco | 55/367 |
| 3,751,881 | A | * | 8/1973 | Hughes | 55/367 |
| 3,755,993 | A | * | 9/1973 | Cote | 55/370 |
| 3,916,770 | A | | 11/1975 | Hanson et al. | |
| 4,155,727 | A | * | 5/1979 | Kaulig | 55/381 |
| 6,009,925 | A | * | 1/2000 | Hall et al. | 156/358 |
| 6,045,595 | A | * | 4/2000 | Freudenberg | 55/382 |
| 6,071,322 | A | * | 6/2000 | Hulthen | 55/367 |
| 6,156,086 | A | * | 12/2000 | Zhang | 55/382 |
| 6,193,773 | B1 | * | 2/2001 | Schlor et al. | 55/382 |
| 6,251,154 | B1 | * | 6/2001 | van Rossen | 55/382 |
| 6,379,409 | B1 | * | 4/2002 | Dijkman | 55/381 |
| 6,514,325 | B2 | * | 2/2003 | Cox et al. | 96/69 |

(Continued)

FOREIGN PATENT DOCUMENTS

CN 14 34 764 8/2003

(Continued)

*Primary Examiner* — Duane Smith
*Assistant Examiner* — Minh-Chau T Pham
(74) *Attorney, Agent, or Firm* — Fay Kaplun & Marcin, LLP

(57) ABSTRACT

Described is a filter bag for a vacuum cleaner which may include a tubular bag with a closed free end area and an opposed, at least partially closed area as well as with a retaining plate. The bag is made from a bag material having at least one non-woven layer, and the at least partially closed area is folded forming a bottomPlies of the bag material which lie the one above the other are formed in areas, and is at least partially closed by a weld seam extending centrally in the bottom, the plies of the bag material which lie the one above the other being at least partially connected to one another.

25 Claims, 5 Drawing Sheets

U.S. PATENT DOCUMENTS

| | | | | |
|---|---|---|---|---|
| 6,872,233 | B2 * | 3/2005 | Smithies et al. | 55/486 |
| 7,115,151 | B2 * | 10/2006 | Smithies et al. | 55/528 |
| 7,254,865 | B2 * | 8/2007 | Bosses | 15/327.2 |
| 7,611,555 | B2 * | 11/2009 | Wattenberg et al. | 55/369 |
| 2003/0168144 | A1 | 9/2003 | Weaver et al. | |

FOREIGN PATENT DOCUMENTS

| | | |
|---|---|---|
| DE | 77 10 874 | 8/1977 |
| DE | 38 12 849 | 10/1989 |
| DE | 100 64 608 | 4/2002 |
| EP | 0 338 479 | 10/1989 |
| EP | 0 813 839 | 12/1997 |
| EP | 1 002 493 | 5/2000 |
| EP | 1 059 056 | 12/2000 |
| EP | 1 192 890 | 4/2002 |
| JP | 11 332 802 | 7/1999 |
| JP | 2003 / 200506 | 7/2003 |
| WO | 01 / 03802 | 1/2001 |

* cited by examiner

FILTER BAG AND METHOD FOR THE PRODUCTION THEREOF

FIELD OF INVENTION

The present invention relates to a filter bag for a vacuum cleaner which has a tubular bag and a closed free end area and an opposed, at least partially closed area, as well as a retaining plate, the partially closed area being folded forming a bottom.

BACKGROUND INFORMATION

Filter bags for vacuum cleaners which have a tubular bag and, as well as a closed free end area, a folded bottom, a so-called "square bottom", are known in the prior art. Usually such dust bags are produced from a paper material which can be processed on standard tubular bag systems. In the case of such filter bags, an appropriate retaining plate is generally attached to the square bottom and has an opening through which the air to be cleaned is led. The task of the square bottom is to stabilise the filter bag and form a three-dimensional bag. Moreover the square bottom makes it easier to fit the bag into the vacuum cleaner.

Recently however, new developments have become known in respect of materials for vacuum cleaner bags. Thus the document WO 01/03802 A1 describes a special non-woven material comprising a plurality of plies of filter material which are independent of one another. These independent plies are connected to form a filter material which has special properties. In practice it has become apparent that vacuum cleaner bags which are produced from such a non-woven material are considerably superior to previously known bags in respect of the efficiency of the vacuum cleaner.

As a result of this bag material being low in flexural strength however, the formation of a square bottom is only possible with difficulty or with great outlay.

The document DE 100 64 608 A1 describes a solution for securing a retaining plate to such a bag. According to this document, first a tubular arrangement of the vacuum cleaner bag is undertaken with the formation of a fold along a longitudinal edge. This tubular arrangement is then separated, such that a second end area is produced. The opposite free ends of such a tubular arrangement are closed and a retaining plate is allocated to an end area after an appropriate opening has been formed. According to the teaching of DE 100 64 608 A1, a special fold is then made in the area of the vacuum cleaner bag between the area provided with the retaining plate and the free end. Stabilisation of the bag which is of low flexural strength is intended to be achieved by means of the special design of transverse folds.

The method described in DE 100 64 608 A1 is very expensive however.

In the document EP 1 059 056 A1 is described a further solution for introducing a retaining plate for a bag into the filter material. According to the solution proposed by EP 1 059 056 A1, two independent plies of the filter material are guided on top of one another and welded together in the edge areas. Subsequently, the welded material is separated and the two open transverse sides are welded together. For introducing a retaining plate, an appropriate hole is stamped into the superposed plies and a reinforcement is laid around the two plies.

What is disadvantageous about this solution is that no bottom is formed here which stabilises the bag per se, but that a reinforcing means, i.e. a retaining plate, must always inevitably be attached. The retaining plate, which is attached according to the above-mentioned European application, must in addition always be foldable since it is laid around the two plies which are placed on top of one another. Thus this bag is subject to great restrictions in relation to its application in the field of vacuum cleaners, since the retaining plate regularly has to fulfill a plurality of functions. With retaining plates it has namely been usual up to now to attach in addition slides or flaps with which the opening can be sealed for the hygienic removal of the vacuum cleaner bag. This is not possible with a foldable embodiment of the retaining plate. It is also not possible to attach the retaining plate e.g. on the longitudinal sides of the bag since there is no bottom present to stabilise the bag.

SUMMARY OF INVENTION

The present invention relates to a filter bag made from a non-woven material which has at least one end area, which is comparable in design to that of a square bottom produced from paper material. The present invention also relates to a method for manufacturing such a filter bag.

Thus according to the invention it is proposed that the vacuum cleaner bag, which is made from a non-woven material, has an at least partially closed end opposite the free closed end, the at least partially closed end being folded to form a bottom. The folding according to the present invention is so executed here that at least in areas there are piles of the bag material lying the one above the other in the bottom of the bag and these are at least partially interconnected. Due to this embodiment, stabilisation of the vacuum cleaner bag is achieved similar to that of a square bottom bag.

The crucial advantage of the solution according to the invention can be seen in the fact that, due to the central weld seam and the at least partial connection of the plies folded over one another, stabilisation of the bottom is achieved which is sufficient to make available, even from a material which is low in flexural strength, a vacuum cleaner bag which can be provided at any point with a retaining plate and which can therefore be easily fitted into a vacuum cleaner. What should be further stressed about the solution according to the invention is that the design of the retaining plate can be freely selected. With the solution according to the invention it is thus possible to attach retaining plates which not only have an opening but which are additionally provided with slides or flaps for sealing the opening. According to the present invention, it is also possible not to attach the retaining plate directly on the bottom but it can also be arranged on the longitudinal surfaces of the vacuum cleaner bag.

With the vacuum cleaner bag according to the invention it is preferred for the central weld seam to extend over the entire width of the bottom. In this way an increased stability of the bottom formed by the folding is achieved. Connecting the superposed plies which have been formed by the fold takes place preferably by welding or gluing. This gluing or welding can take place in a linear manner. Thus a directed reinforcement of the bottom can be achieved.

In the case of the vacuum cleaner bag according to the invention it is furthermore propitious if pre-creases are introduced over the longitudinal sides, i.e. over those surfaces of the vacuum cleaner bag which lie between the closed free end and the at least partially closed end having the bottom designed according to the invention, into the thus spread-apart side surfaces so that folding is possible. The pre-creases can be so designed that they start e.g. from the respective corners of the bottom, if it is angular, e.g. square, and are led to the opposite free end. It is advantageous moreover if, in addition, starting from the central weld seam, a further pre-crease is introduced into the bag material in each case. Thus the introduction of side folds is facilitated and the surface of the vacuum cleaner bag is enlarged. Simultaneously, the pre-creases introduced into the longitudinal sides of the vacuum cleaner bag can serve to further stabilise the bag material. Under “pre-creases” in the sense of the invention are understood material compressions which are preferably configured linear. The pre-creases can be introduced by a suitable forming tool and/or by welding.

Advantageously, the filter bag according to the invention also has a pre-crease which extends parallel to the central weld seam. This serves to fold the bottom over in the direction of the longitudinal side of the filter bag. It is therefore sufficient for one such pre-crease to be present. The spacing of the pre-crease is so selected that, starting from the central weld seam, it corresponds to the width of the bottom of the bag.

It is preferred in the case of the bag according to the invention for the bottom to be angular, by particular preference to have a rectangular shape. In this case, the pre-creases start from the respective short sides of the rectangular and extend up to the free closed end. A further pre-crease extends from the central weld seam to the free end. Such an embodiment has proved to be particularly preferred.

As regards the retaining plate, it is possible according to the present invention either, as is known from paper filter bags, to connect the retaining plate to the square bottom or to attach the retaining plate to the free side surfaces of the vacuum cleaner bag. Preferred here is the embodiment in which the retaining plate is attached to the bottom of the bag, at least partially covering the latter. Because, according to the present invention, the bag is stabilised by the design of the bottom, the retaining plate can also be attached lying inside the bag. This can be realised for example in that the retaining plate is introduced and connected at the same time as the die provided for forming the bottom.

It is advantageous furthermore that, due to the stabilisation of the bottom as such, one-piece retaining plates can be used. These can also then be provided with a closing mechanism.

The retaining plate is here constructed as known per se from the prior art and has at least one through opening which serves to feed in the air to be cleaned. The retaining plate can furthermore have an element, e.g. a slide or a flap, for sealing the opening. The retaining plate can here be connected to the bottom of the bag using any current technique of the prior art. Gluing or welding can be considered for this purpose for example.

According to the present invention, however, it is also possible for the retaining plate to be arranged on the side surfaces of the vacuum cleaner bag. It is preferred here for the retaining plate to be attached in the vicinity of the bottom of the bag since thus the bag interior freely spread-apart by the bottom can be used for introducing a filling nozzle and for advantageous air conduction.

The retaining plates can, as known per se from the prior art, be made from plastics material or cardboard.

In the case of the filter bag according to the present invention, the bag material is preferably to be formed from a multilayer non-woven material such as is described e.g. in WO 01/03802 A1. Reference is therefore expressly made to the disclosed content of this document. The invention however also includes all other non-woven materials which have been known up to now in the prior art for filter bags.

The invention relates furthermore to a method for manufacturing a filter bag as described above. According to the present invention, in a first method step a tubular bag is produced which has an at least partially closed end area.

The production of this tubular bag having the at least partially closed end area can here take place in cycles. The tubular bag is produced by forming the tubular material through connecting e.g. the two edges of a ply of the bag material, and then the open area thus formed is closed.

Connecting the edges of the plies and closing the open end can take place in cycles. Continuous connection of the edges of the plies is also possible.

For reasons of process economy, it is advantageous if the connection of the open end and the closing of the free end of the previously produced filter bag take place at the same time. Separation of the bag can also take place at this stage.

The connection process both during the formation of the tube and also during the connection of the open end can take place by means of ultrasonic welding. Thermowelding is also possible.

The welding is preferably undertaken in such a way that the weld seam extends over the two webs lying the one above the other.

In the method according to the invention provision is furthermore made for the pre-creases to be formed during method step a). Thus, according to the present invention the pre-creases are introduced into the filter bag by suitable forming tools or also by additional weld seams.

However, the invention also includes those embodiments in which the pre-creases are introduced in a method step before or after method step a). For reasons of process economy, however, the above-described variant is preferred in which the pre-creases are already introduced during method step a).

According to the present invention, the bottom of the bag is formed by a die being introduced from the open side into the bag produced according to method step a). This leads automatically in the closed end to a fold appearing in the region of the bottom. For stabilising the thus-formed bottom, it is then essential that the plies lying the one above the other as a result of the folding are at least partially connected. This is preferably carried out in such a way that the superposed plies are glued or welded together. Thus additional stabilisation of the bottom is achieved. In respect of the methods for connecting the superposed plies, all the methods known from the prior art can be used. Gluing or welding could be mentioned here. The individual plies could also be stapled together. If the plies are connected by means of welding or gluing, it is furthermore preferred for this to take place in a linear manner.

A further advantage of the method according to the invention can be seen in the fact that the die provided for forming the bottom is used as an anvil. The anvil can also serve as a sound reflector for a sonotrode during ultrasonic welding. The anvil can also serve as the supporting element for forming pre-creases. Furthermore it can also be used as a supporting element as the filling opening is being stamped. The reverse method sequence is also possible. Thus the die can also be used as a sonotrode.

Thus due to the method of the invention, folding of the bottom is achieved which leads to stabilisation in the bottom area of the material which is low in flexural strength. This opens up the possibility that the retaining plate can be arranged not only in the area of the bottom directly on the bottom but can also be attached to the longitudinal sides of the bag. The method according to the invention also opens up the possibility of arranging the retaining plate inside lying on the bottom of the bag. For this purpose, the retaining place is introduced in one working cycle with the die and is welded/glued to the bag material. According to the present method, it is still necessary for an appropriate opening to be introduced into the bag at the points at which the retaining plate is attached. Insofar as the retaining plate is arranged directly on the bottom, an appropriate opening is introduced into the bottom area. This opening can be introduced either in the web which is not yet formed into a tube or during method step a). The filling opening can also be introduced in method step b) or already in the web before it is shaped into a tube, i.e. before method step a).

BRIEF DESCRIPTION OF DRAWINGS

The invention is described in greater detail below with the aid of FIGS. 1 to 4.

DETAILED DESCRIPTION

Figure 1:
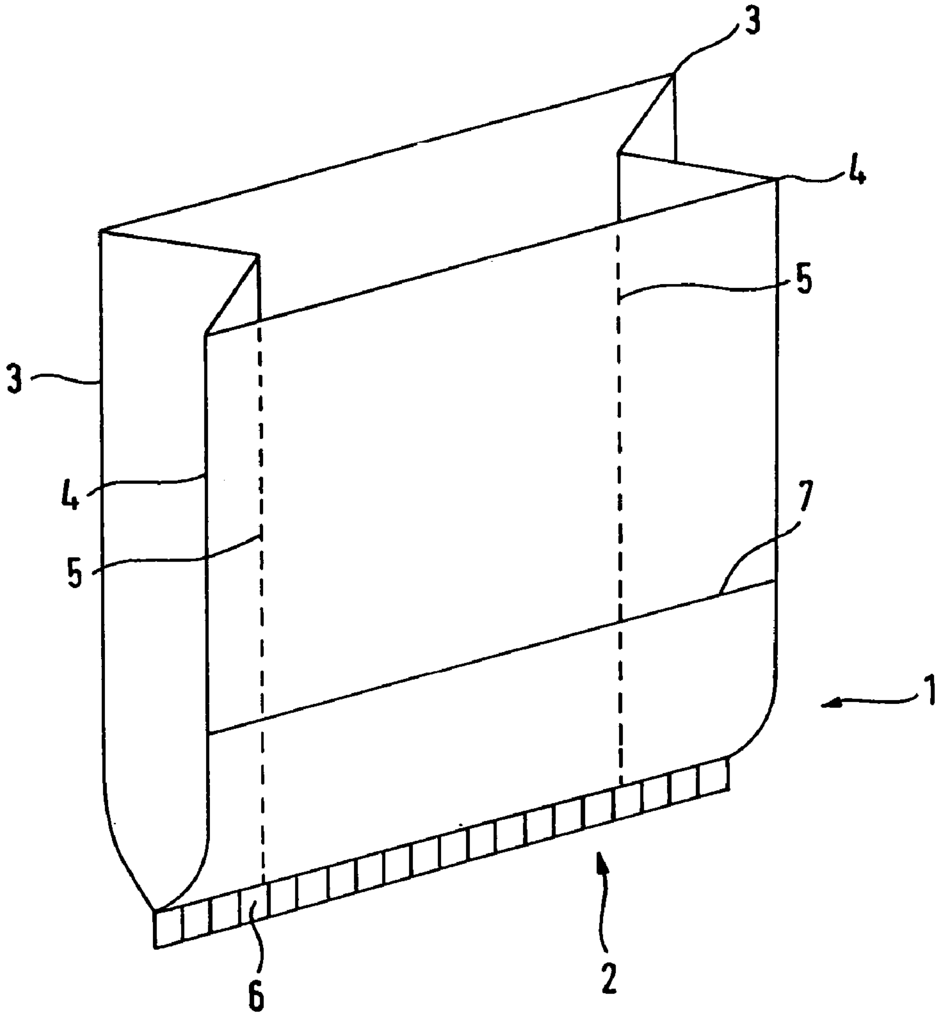
FIG. 1 shows an exemplary embodiment of a filter bag according to the present invention in a semi-finished state and open at one side.

FIG. 1 shows an exemplary embodiment of the filter bag 1 according to the present invention schematically in the state resulting from the formation of the tubular bag and the closing of the free end area (method step a)). The filter bag 1 here consists of a composite non-woven material, such as is described in WO 01/03802 A1. In the embodiment according to FIG. 1, the filter bag has pre-creases 3, 4 and 5 which lead to the illustrated fold formation. As "pre-crease" is here understood a material compression. This can be produced either by pressure or by pressure and temperature. Due to the pre-creases 3, 4 and 5, a folded tubular filter bag is produced which is sealed at its closed end 2 by a weld seam 6.

In the embodiment according to FIG. 1, the central weld seam 6 is introduced by thermowelding. The welding is here so executed that the two superposed plies of the filter material have been interconnected by the welding. The filter bag according to FIG. 1 has in addition a further pre-crease 7. This serves to fold the bottom over.

Figure 2:
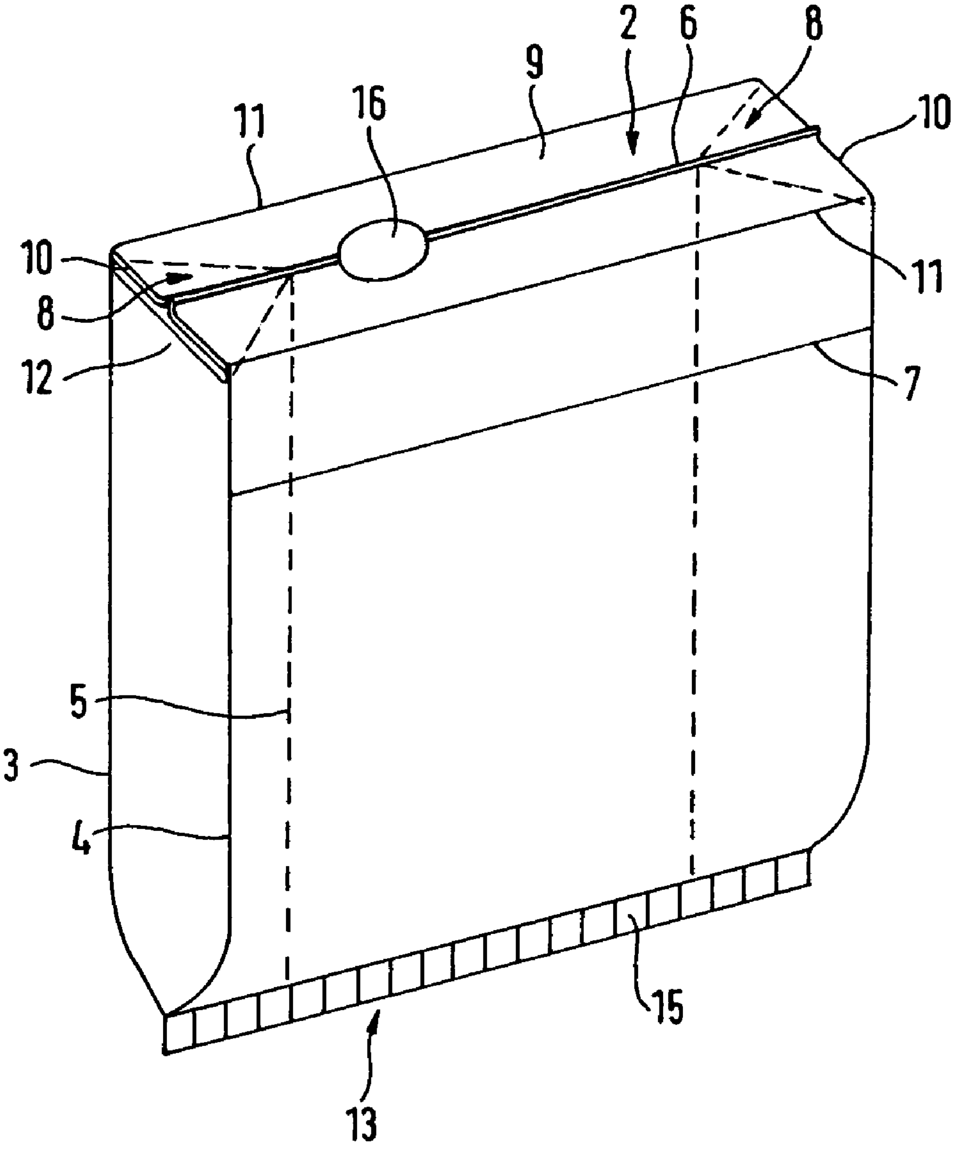
FIG. 2 shows an exemplary embodiment of a filter bag according to the present invention which has a rectangular bottom.

FIG. 2 shows the filter bag 1 in a preferred embodiment. The filter bag 1 according to FIG. 2 has a rectangular bottom 9 with two short transverse sides 10 and two longitudinal sides 11. In the inventive filter bag 1 according to FIG. 2, the pre-creases are designated as 3, 4 and 5 in the same way as in FIG. 1. The contour of the filter bag 1 is determined by these pre-creases 3, 4 and 5. What is essential about the filter bag according to the invention is the folding, i.e. the design of the bottom 9. The bottom 9 has a fold at its short transverse sides 10. The fold is produced by layering the filter material over itself as is illustrated in FIG. 1. The geometry of the fold is here determined by the pre-creases 3, 4 and 5. In the edge area 10, a triangular gusset is thus covered under the spread-apart bottom 9. The triangular gusset 8 formed is shown by broken lines in FIG. 2. The outer edge member 12 of the triangle is connected according to the invention to the transverse side 10 of the bottom 9 of the bag. In the example according to FIG. 2, the transverse side 10 of the bottom 9 is glued to member 12. According to the present invention, however, every other embodiment is included in which other connecting techniques known from the prior art are used. Such connection can take place e.g. also by means of ultrasonic welding or by stapling. In the embodiment of FIG. 2 is provided furthermore an additional pre-crease 7. This serves to fold the bottom over in the direction of the longitudinal side of the bag 1. The spacing of the pre-crease 7 from the central weld seam 6 therefore corresponds to the width of the bottom 9, such that folding the bottom 9 over completely is possible.

The filter bag 1 is furthermore closed at its free end 13 by a further weld seam 15. In the case of the filter bag according to the invention, reference should particularly be made to the fact that due to the folding as described above and the connection of the plies as well as the central weld seam 6, stabilisation of the bottom 9 is produced. The great advantage of the filter bag according to the invention can be seen in the fact that the bottom 9 has sufficient stability even without any additional retaining plate. In the embodiment according to FIG. 2, the bottom also has a through hole 16. This through hole 16 can then be provided with a retaining plate (not illustrated) such that the filter bag can then be suspended in a corresponding holder in the vacuum cleaner.

Figure 3:
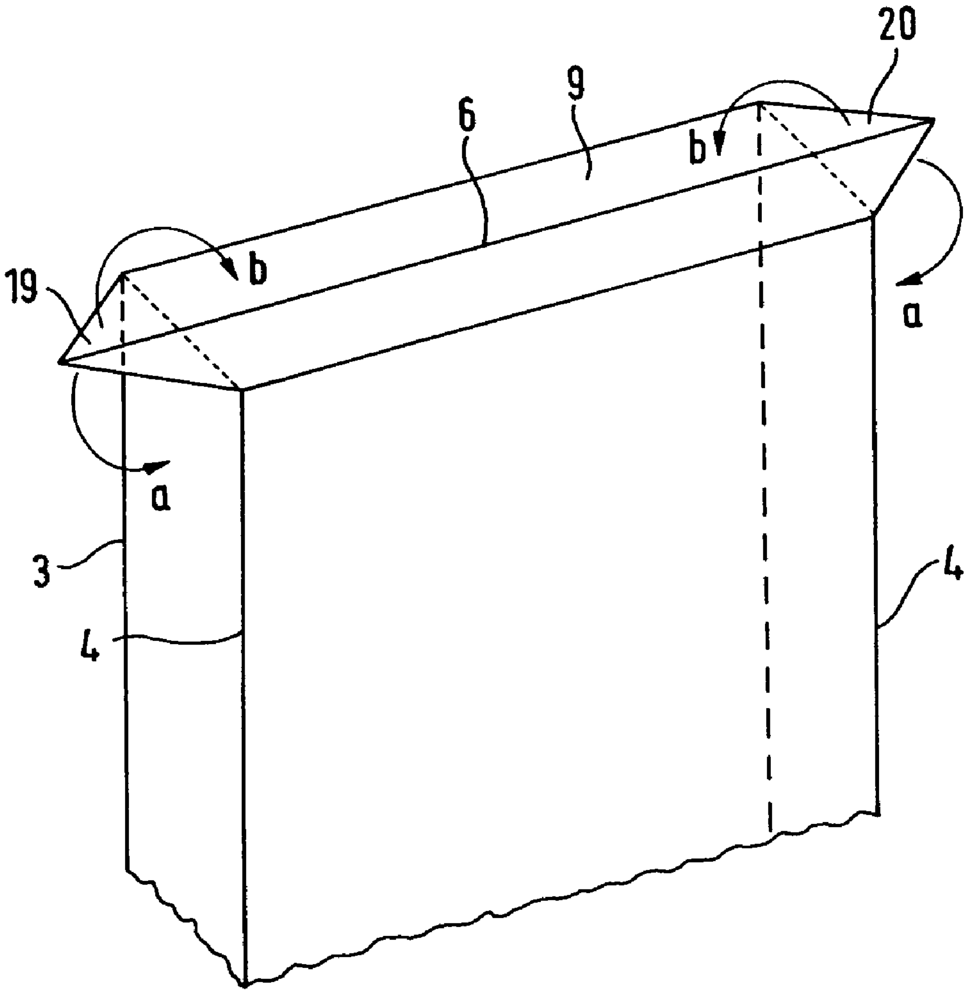
FIG. 3 shows a further exemplary embodiment with a special folding of the bottom.

FIG. 3 now shows a possible further option for undertaking the folding of the bottom 9. In the embodiment according to FIG. 3, there is again provided a central weld seam 6. As FIG. 3 shows, in this embodiment a gusset 19 and 20 is formed which, as is apparent from the figure, can be folded round in two different directions. Thus it becomes possible to fold the gusset downwards onto the side surfaces of the filter bag 1 and glue it there (arrow direction a) or the gusset can be folded back onto the remaining part of the bottom 9 and be glued there also. Stabilisation of the bottom 9 is again achieved by this embodiment also. The filter bag according to FIG. 3 again has pre-creases 3, 4 which determine the contour of the filter bag.

Figure 4A:
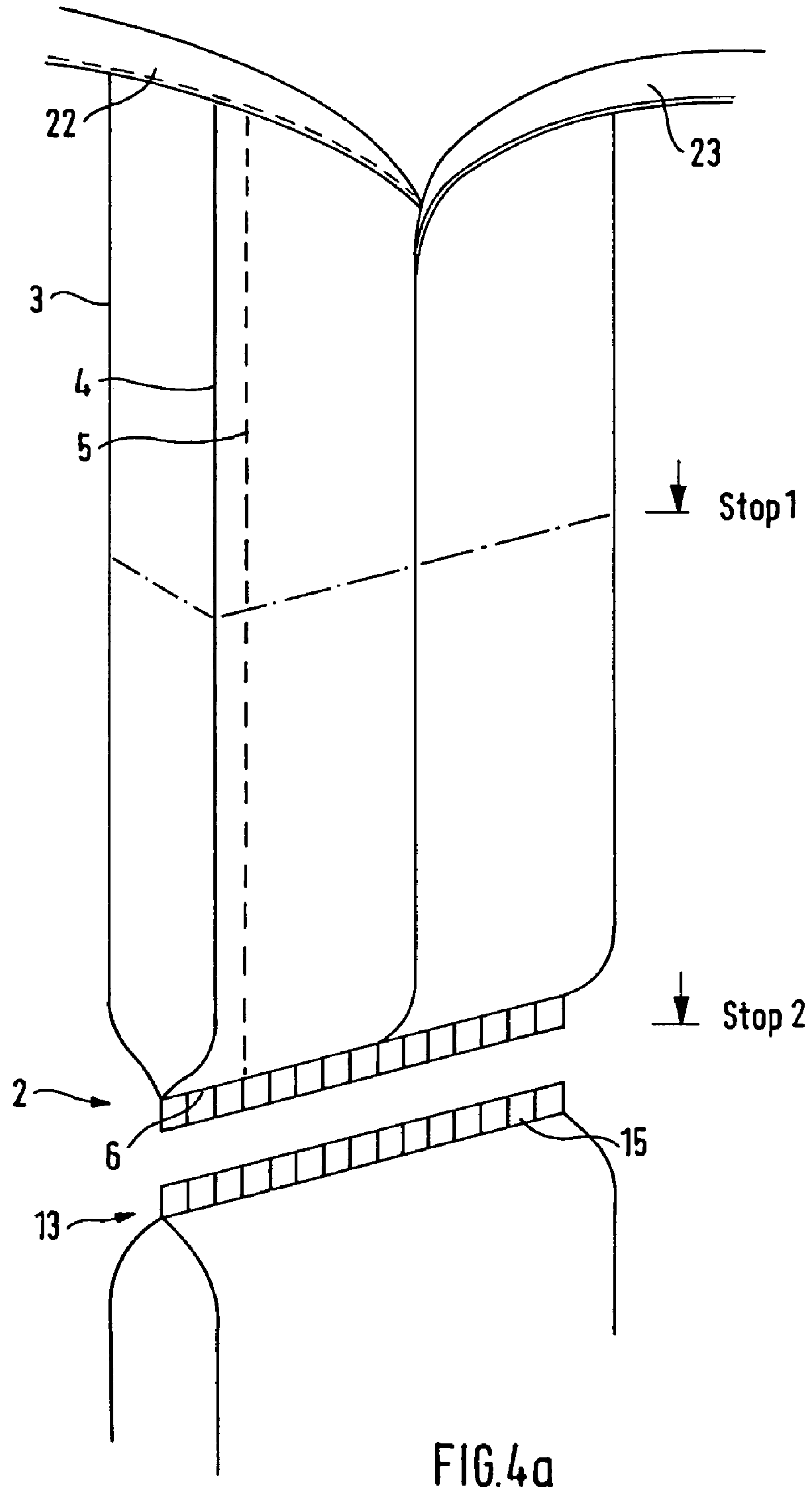
FIGS. 4*a*, 4*b* and 4*c* show the sequence of the manufacturing process.
Figure 4B:
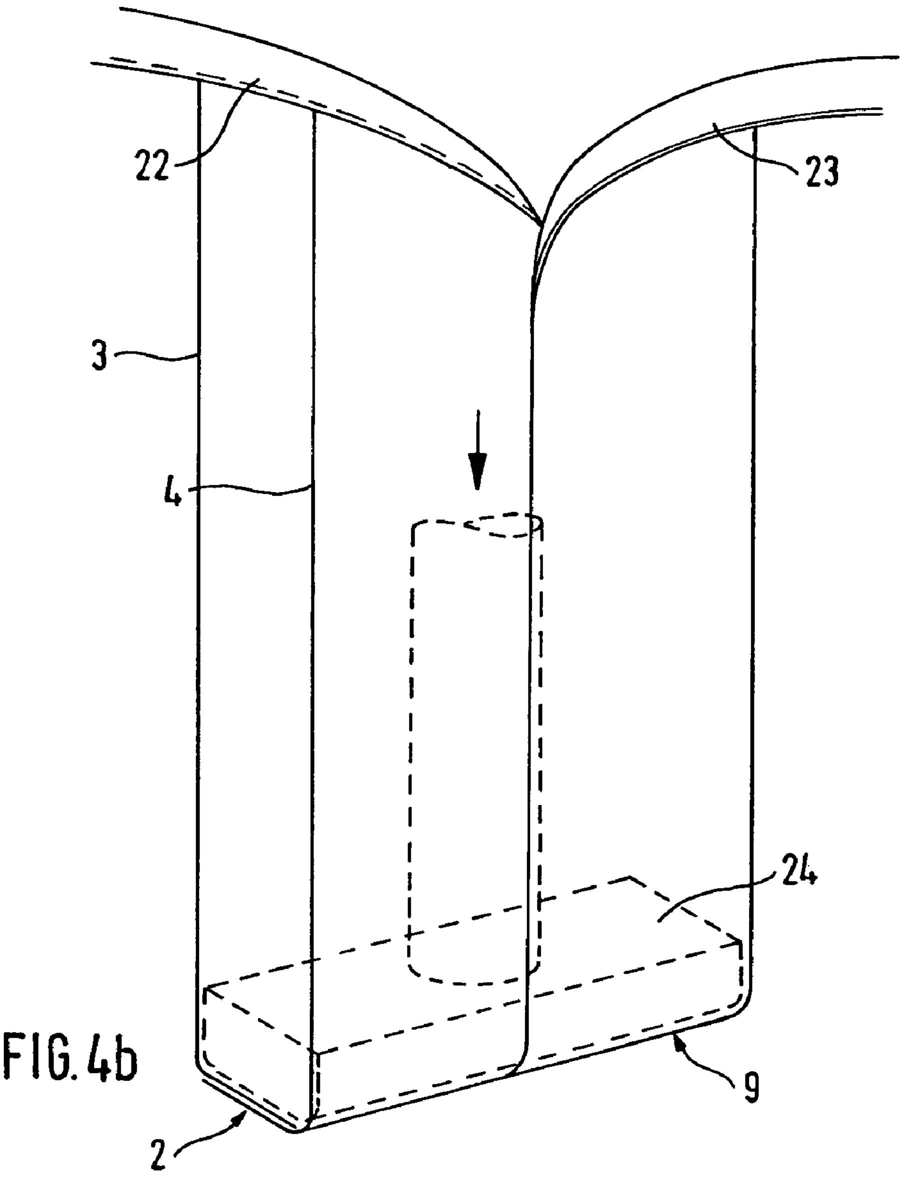
Figure 4C:
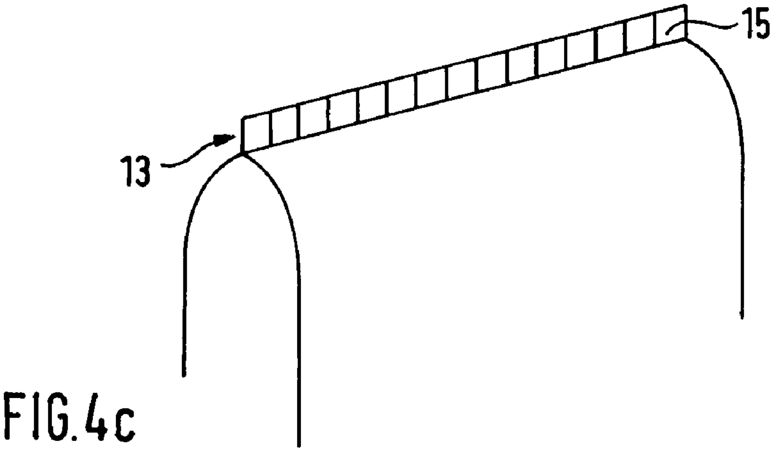

FIG. 4 now shows, with the aid of FIGS. 4*a* to 4*c*, the sequence of the manufacturing method according to the invention.

FIG. 4*a* shows schematically how a ply of the filter material is folded together and connected at its edges 22 and 23. The contour of the corresponding filter bag is here defined by means of a forming tool, not shown. During the process of manufacturing the filter bag, the appropriate pre-creases 3, 4 and 5 are introduced into the filter bag material also in the first method step, i.e. as the tube is being formed. The connection of the filter material at edges 22 and 23 preferably takes place in cycles, i.e. the welding is undertaken at the position shown in FIG. 4*a* by the designation "Stop". Following this cycle, the tube thus formed is led on to the position designated as "Stop 2". At this point, the bag is now closed. This is preferably carried out by ultrasonic welding. As FIG. 4*a* shows, the method according to the invention preferably operates in such a way that, with the closing of the tube and the formation of the central weld seam 6, the filter bag produced in the previous working cycle is closed at its opposite free end 13. According to the present method therefore, closing and separation of the filter bag take place in one working cycle. This can be carried out using a divided welding tool.

FIG. 4*b* shows the step of the method according to the invention in which the folding of the bottom is carried out. The folding of the bottom is carried out after the filter bag has been closed at its end 2 by the weld seam 6. This is illustrated in FIG. 4*a*. To form the bottom of the bag, a die 24 is introduced into the filter bag from the side which is still open and guided against the closed end 2. By introducing the die 24 in the direction of the closed end 2, the inventive folding of the bottom 9 is achieved due to the provision of the pre-creases 3, 4 and 5. Even whilst the die is in its lower position (FIG. 4*b*), this folding is stabilised by connecting the plies which now lie the one above the other.

To complete the filter bag, separation of this bag from the previous filter bag as described above produces the finished bag as shown in FIG. 4*c*.

According to the method of the invention, provision is also made for introducing appropriate openings into the filter bag. The opening is here preferably introduced during method step a) or b) into the filter bag material. Finally, for completing the filter bag it is still necessary also to attach the retaining plate. The retaining plate can be attached e.g. at the same time as the bottom of the bag is formed or it is attached subsequently.

The invention claimed is:

1. A filter bag for a vacuum cleaner, comprising:

a substantially tubular bag made from a bag material having at least one non woven composite layer, the bag having a closed free end area and an at least partially closed area opposite the closed free end area; and a retaining plate, wherein edges of the bag are at least partially interconnected by a weld seam to form the at least partially closed area, and wherein a bottom of the bag is formed by folding plies of the bag material to lie one above another and at least partially interconnecting the plies of the bag material, wherein the plies are interconnected by welding, and wherein a pre-crease is introduced into the bag material substantially parallel to the weld seam in the bottom.

2. The filter bag according to claim 1, wherein the weld seam in the bottom extends over an entire width of the bottom.

3. The filter bag according to claim 1, wherein the welding is linear.

4. The filter bag according to claim 1, wherein the bottom has a substantially square shape.

5. The filter bag according to claim 1, wherein the bottom has a substantially rectangular shape.

6. The filter bag according to claim 1, wherein, starting from the bottom to the closed free end area, at least one pre-crease is introduced in the bag material.

7. The filter bag according to claim 4, wherein, starting from respective corners of the bottom to the closed free end area, pre-creases are introduced into the bag material.

8. The filter bag according to claim 1, wherein, starting from the weld seam in the bottom, at least one pre-crease is introduced into the bag material up to the closed free end area.

9. The filter bag according to claim 1, wherein the pre-crease is introduced into the bag material spaced from the weld seam by a distance corresponding to approximately a width of the bottom.

10. The filter bag according to claim 1, wherein the retaining plate is arranged on the bottom to at least partially cover the bottom, the retaining plate having at least one through hole.

11. The filter bag according to claim 10, wherein the retaining plate covers an entire area of the bottom.

12. The filter bag according to claim 1, wherein the retaining plate is arranged on an area spread between the closed free end area and the at least partially closed end area, the retaining plate having at least one through hole.

13. The filter bag according to claim 12, wherein the retaining plate is arranged in a region of the bottom.

14. The filter bag according to claim 1, wherein the retaining plate is connected to the filter bag using at least one of gluing and welding.

15. The filter bag according to claim 1, wherein the retaining plate is formed from a plastic material.

16. The filter bag according to claim 1, wherein the retaining plate is formed from a cardboard.

17. A method for manufacturing a filter bag according to claim 1, comprising of steps:

a) producing a substantially tubular bag having at least partially closed area on a closed side of the bag;

b) introducing a die from an open side of the bag in a direction of the closed side of the bag so that a bottom is produced by folding the bag over the die; and c) connecting, by welding, plies in the bottom which, as a result of the folding, are arranged one above the other, wherein, during step a), pre-creases are introduced into the bag material, wherein at least one of the pre-creases is substantially parallel to the partially closed area on a closed side of the bag.

18. The method according to claim 17, wherein step a) is performed in cycles, a tube being produced from a filter material and the open side being closed.

19. The method according to claim 17, wherein, wherein, while the at least partially closed area is being produced in the step a), a free end of a previously produced bag is simultaneously closed.

20. The method according to claim 19, further comprising separating from one another bags produced in a single working cycle.

21. The method according to claim 20, wherein the separating step takes place mechanically.

22. The method according to claim 17, wherein the pre-creases are introduced by at least one of a suitable forming tool and welding.

23. The method according to claim 17, wherein the die is used as a sound reflector for a sonotrode.

24. The method according to claim 17, wherein the die is used as a sonotrode for a sound reflector.

25. The method according to claim 17, wherein, during step a), an opening is introduced into the filter material forming a web.

* * * * *